Bell & Bronson,
Wheel Cultivator.
No. 89,729.    Patented May 4, 1869.
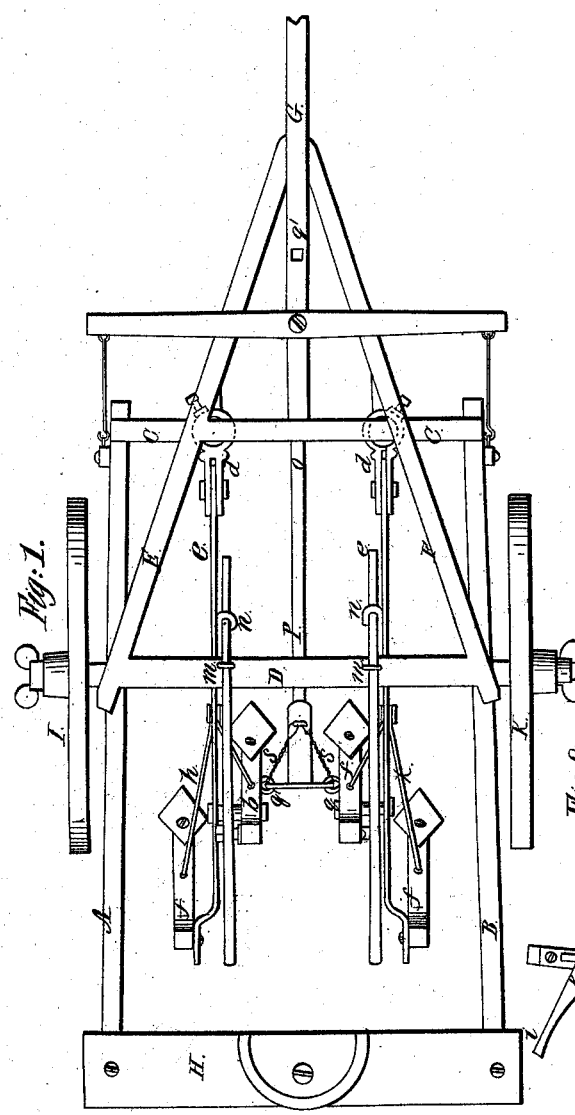
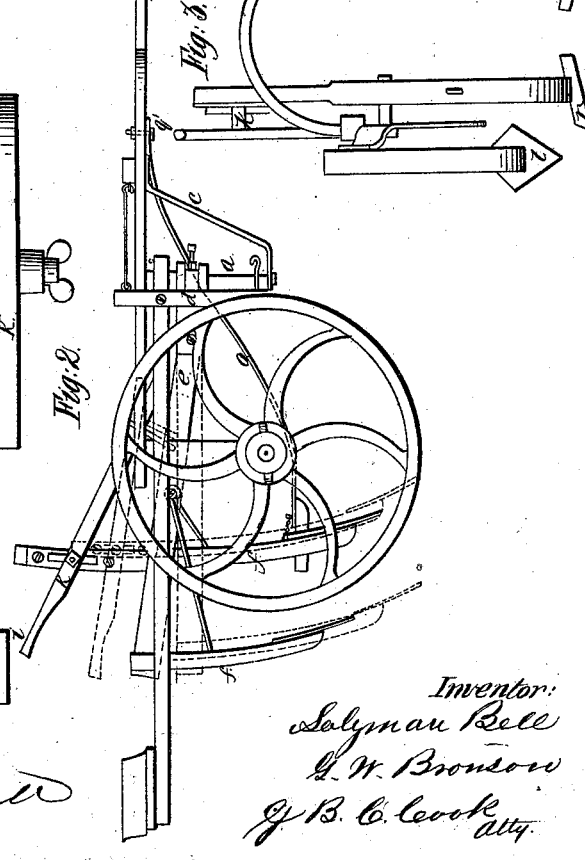
Witnesses:
G. Twitell
James S. Grinnell
Inventor:
Solyman Bell
G. W. Bronson
B. C. Cook
Atty

United States Patent Office.

SOLYMAN BELL AND GEORGE W. BRONSON, OF LA SALLE COUNTY, ILLINOIS.

Letters Patent No. 89,729, dated May 4, 1869.

IMPROVEMENT IN CORN-CULTIVATORS.

The Schedule referred to in these Letters Patent and making part of the same.

*To all whom it may concern:*

Be it known that we, SOLYMAN BELL and GEORGE W. BRONSON, of the county of La Salle, and State of Illinois, have invented a new and useful Improvement on a Machine for Cultivating Corn; and we do hereby declare that the following is a full, clear, and exact description of the construction and operation of the same, reference being had to the annexed drawings, making a part of this specification, in which—

Figure 1 is a plan view.
Figure 2 is a side view.
Figure 3 is a rear view of gopher-frame.
Figure 4 is a side view of gopher-frame.

To enable others to make and use our improved machine, we will proceed to describe its construction and operation.

We construct a frame-work carriage, composed of wood bolted together, as shown in fig. 1, side-pieces A and B, cross-pieces C and D, braces E and F, and rear bar H, on which is placed a driver's seat.

This frame is furnished with a tongue, G, whiffle-trees, &c., and is supported on wheels I and K.

To this frame-work carriage the beams, the shield, and handles, are attached as follows:

1. *The Beams.*

The iron rod $a\ a$, fig. 2, is attached to the front corners of the frame at point $b$, and strengthened by brace $c\ c$. Upon this rod is placed the adjustable collar-clevis $d$, shown at large, fig. 2.

This clevis is furnished with collar and set-screw by which it can be readily made fast at any place on the rod $a\ a$, so as not to slide up or down, while it can turn toward either side freely. The forward end of the beam $e\ e$ is inserted in the rear end or jaw of the clevis and fastened with a bolt which allows the rear end of beam to be raised and lowered at pleasure. The depth of the shovels can be easily regulated, therefore, by loosening the adjustable collar-clevis upon the rod $a\ a$, and raising or lowering at pleasure, and then fastening to place by the set-screw in the collar.

2. *Standards.*

The standards $f\ f$ are attached to the beam by bolts $g\ g$, and strengthened by braces $h\ h$. The tops of the long standards are furnished with handles, $i\ i$, fastened by T-bolt and socket, $k\ k$.

To the bottom of standards are attached the diamond-shaped shovels $l\ l$.

The two long standards are also connected as follows:

An eye-bolt is put through each standard at the point $q$, with nuts on each side of standards. These eye-bolts are connected by an iron rod with an eye at each end.

By this connection the two beams are kept at a uniform distance apart, and this distance may be graduated to suit the operator by means of the screw and nuts each side of standard, while at the same time each beam and the attached shovels can have an independent motion up and down.

3. *The Handles $i\ i$.*

The handles, as before stated, are fastened by bolt and socket to the tops of the long or forward standards and pass through staples $m\ m$, in which they work loosely. These staples are inserted in cross-bar of frame D. The beams are furnished with hooks $n\ n$.

When it is desired to raise the shovels entirely out of the ground, and carry them clear of it, the rear ends of the handles are raised by the driver. This raises the rear end of beams, and lower front ends of handles, so that they can be inserted in the hooks $n\ n$, and the whole cultivator will then ride clear of the ground.

4. *The Cylinder-Shield.*

This shield is attached to the tongue by the rod $o\ o$, which is furnished at the rear end with a spring, $p$, which causes the shield to hug the ground.

The rod $o\ o$ is attached to the tongue by a bolt, $q$, which allows the shield free lateral motion.

The rear end of shield is attached to the long standards by means of chains, so that the shield cannot have any lateral motion, except that of the standards and shovels.

The driver of the machine can therefore give to the standards such lateral motion as he may desire, by means of the handles $i\ i$, and this motion will, through the chains, be communicated to the cylindric shield, or the driver may give a lateral motion to the shield with his foot, and this same motion will, by means of the chains, be communicated to the standards and shovels.

5. *The Diamond-Shovels.*

The cultivator-shovels are cut away at the top in the same shape as at the bottom, so as to be of diamond-shape.

This allows the earth to pass over the tops of the shovels, instead of forcing it toward each side of them, and leaves the ground level, instead of in grooves. It also makes the draught of the machine much easier, and renders it more easy to handle.

6. *Gopher.*

A separate beam, as shown in figs. 3 and 4, furnished with a gopher, $r$, upon the forward or long standard, and a diamond-shovel on the short or rear standard, is inserted in the machine in the place of the beam furnished with diamond-shovels throughout, whenever it is desired to use the gopher in combination with the shovels.

These beams are attached to the frame by the adjustable collar clevis, and to the rest of the machine in the same manner as the beams first herein described, except that the long forward standards are connected by a bow, as shown in figs. 2 and 3, instead of the rod hereinbefore described.

What we claim as our invention, and desire to secure by Letters Patent, is as follows:

1. The method by which the half-cylinder shield is attached to the tongue and standards, by spring rod and chains, as above described.

2. The adjustable collar-clevis, by which the beams are attached to the frame.

3. The manner of attaching the handles of the machine to the standards, and to the frame by means of the loose staples and bolt and socket.

4. The whole machine, as a combination of gopher and cultivator, operating as hereinbefore more particularly described.

SOLYMAN BELL.
GEORGE W. BRONSON.

Witnesses:
ARTHUR GRAY,
WILLIAM GRAY.